US005975436A

United States Patent [19]

Reiter et al.

[11] Patent Number: 5,975,436

[45] Date of Patent: Nov. 2, 1999

[54] ELECTROMAGNETICALLY CONTROLLED VALVE

[75] Inventors: Ferdinand Reiter, Markgröningen; Hubert Stier, Schwieberdingen, both of Germany

[73] Assignee: Robert Bosch GmbH, Stuttgart, Germany

[21] Appl. No.: 09/051,251

[22] PCT Filed: May 16, 1997

[86] PCT No.: PCT/DE97/01006

§ 371 Date: Apr. 6, 1998

§ 102(e) Date: Apr. 6, 1998

[87] PCT Pub. No.: WO98/06939

PCT Pub. Date: Feb. 19, 1999

[30] Foreign Application Priority Data

Aug. 9, 1996 [DE] Germany ........................... 196 32 196

[51] Int. Cl.[6] ............................... B05B 1/30; F16K 31/02

[52] U.S. Cl. .................................... 239/585.1; 239/585.4; 239/585.5; 239/533.9; 251/129.15; 251/129.21

[58] Field of Search ............................. 239/585.1, 585.2, 239/585.3, 585.4, 585.5, 533.9, 533.11; 251/129.15, 129.21

[56] References Cited

U.S. PATENT DOCUMENTS

| | | | |
|---|---|---|---|
| 4,944,486 | 7/1990 | Babitzka | 251/129.21 |
| 5,580,001 | 12/1996 | Romann et al. | 239/585.4 |
| 5,636,827 | 6/1997 | Kiilgore et al. | 239/585.5 X |

FOREIGN PATENT DOCUMENTS

| | | | |
|---|---|---|---|
| 264640 | 4/1988 | European Pat. Off. | 239/585.5 |
| 358922 | 3/1990 | European Pat. Off. . | |
| 0 690 224 | 1/1996 | European Pat. Off. . | |
| 4008675 | 9/1991 | Germany . | |
| 44 20 176 | 12/1995 | Germany . | |

*Primary Examiner*—Andres Kashnikow
*Assistant Examiner*—Robin O. Evans
*Attorney, Agent, or Firm*—Kenyon & Kenyon

[57] ABSTRACT

The electromagnetically actuatable valve includes a valve seat support and a valve needle, both of which are of elongated configuration As a result, the spray discharge point of the valve is advantageously set far forward, which makes possible highly targeted spray discharge. A joining part joining the armature and the valve closure element is configured as a punched and bent part, and has over the majority of its axial extension an open profile differing from a circular cross section. The valve needle thus possesses a mass which is lower as compared with conventional valve needles of identical overall size. The valve is particularly suitable for use in a fuel injection system of a mixture-compressing, spark-ignited internal combustion engine.

11 Claims, 2 Drawing Sheets

ELECTROMAGNETICALLY CONTROLLED VALVE

FIELD OF THE INVENTION

The present invention relates to an electromagnetically actuable valve.

BACKGROUND INFORMATION

German Patent Application No. 40 08 675 describes a needle valve for an electromagnetically actuatable valve which consists of an armature, a valve closure member, and a sleeve-shaped joining part which joins the armature to the, for example, spherical valve closure member. Permanent connections between the individual needle components are achieved, for example, by laser welding. The armature fits around the joining part completely radially and at least partially axially, since the joining part is attached in a continuous longitudinal opening of the armature. The joining part has a continuous internal longitudinal opening in which fuel can flow toward the valve closure member and then emerges, near the valve closure member, through radially extending transverse openings situated in the wall of the joining part. The tubular joining part has a constant diameter over its entire axial length, so that a cross section which is circular throughout (when viewed in an axial direction) is present, interrupted only by a narrow longitudinal slit and transverse openings.

German Patent Application No. 44 20 176 describes an electromagnetically actuatable valve which includes a valve needle, an armature, a valve closure member, and a joining part which joins two needle components. The joining part is produced from a profiled blank and allows fluid flow only externally from the profile. The profile arms of the profiled joining part are provided acts to yield cross-shaped, Y-shaped, triangular, circular segment -shaped, and other cross sections. Because of the solid configuration of the joining parts made from profiled blanks, the mass of the valve needle is comparatively large.

European Patent Application No, 0 690 224, describes a fuel injection valve which includes a nozzle opening which, when the valve is installed, its positioned in an interior portion of an intake conduit, so that spray discharge can occur essentially directly into an intake valve of an internal combustion engine, thus avoiding any wall wetting. In some circumstances, displacing the spray discharge point forward increases the mass and volume of the injection valve due to the elongation of individual valve components.

SUMMARY OF THE INVENTION

The electromagnetically actuatable valve according to the present invention, its advantageous that in a simple and economical manner, a reduction in the weight of the valve is attained as compared with the conventional valves having the same overall size. According to the present invention, this is achieved by using a punched and bent part made of sheet metal (as a joining part of a valve needle). This punched and bent part includes, over a large part of its axial extension, an open profile differing in cross section from an annular shape, and which has a smaller outer periphery than the peripheries of the annular profile of the ends of the joining part or of profiles of comparable conventional joining parts or valve needles. Another advantage of the valve needle according to the present invention is that the valve needle is easily manufactured using bending and impression processes. The configuration of the profiled joining part can provide a mass reduction of approximately 30% as compared with joining parts configured in continuously tubular fashion with an annular cross section, or to an even greater mass reduction as compared with valve needles of solid configuration. This mass savings its particularly significant for elongated valves, in which the spray discharge point of the valve is set far to the front. As a result, the spray discharge region extends far into, for example, the intake conduit of an internal combustion engine, Wall wetting of the intake manifold can easily be prevented by targeted spray discharge onto one or more intake valves, thus reducing fuel consumption and the exhaust emissions of the internal combustion engine. Since the wear forces on the valve seat of the valve are proportional to the mass of the valve needle, a considerable decrease in wear on the valve seat can be achieved by reducing mass.

Profiles particularly suitable for the joining part of the valve needle have U-, C-, V-, or hairpin-shaped cross sections. These geometries of the joining parts provide a high load-bearing capacity for bending and kinking.

DETAILED DESCRIPTION OF THE DRAWINGS

Figure 1:
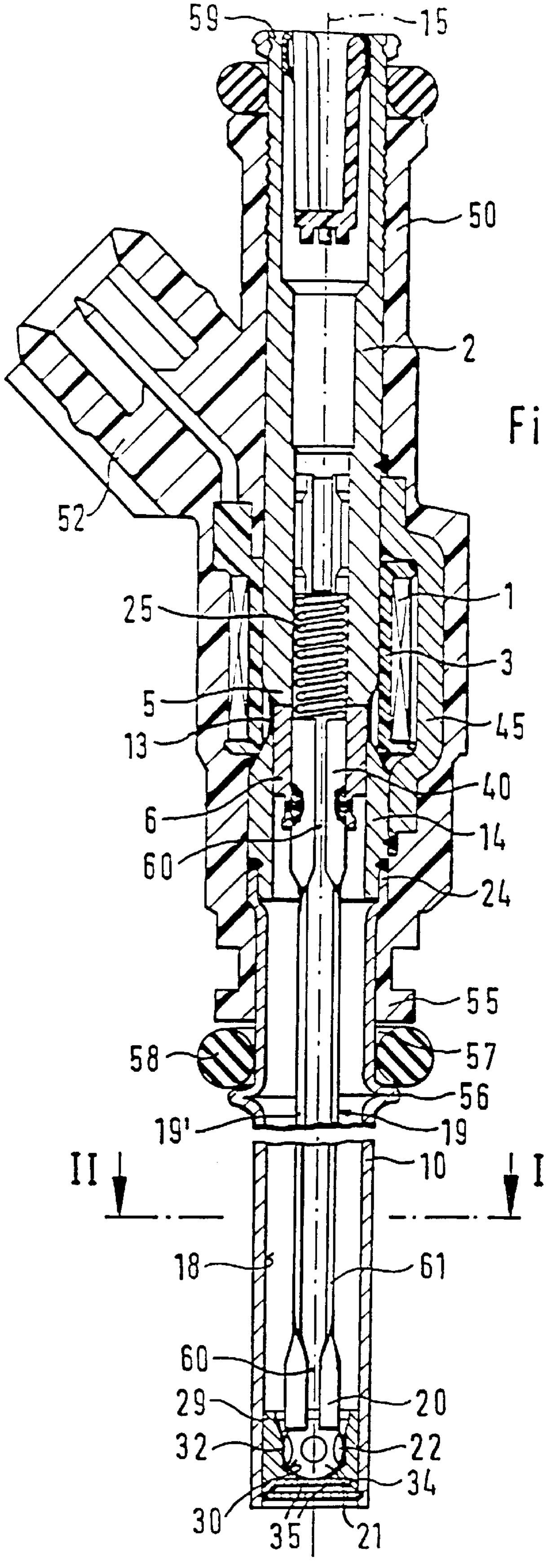
FIG. 1 shows an exemplary embodiment of a valve according to the present invention.

An exemplary electromagnetically actuatable valve shown in FIG. 1, in the the form of an injection valve for fuel injection systems of mixture-compressing, spark-ignited internal combustion engines, hats a tubular core 2, surrounded by a magnet coil 1 and serving as the fuel inlet fitting, at the so-called internal pole. A coil body 3 receives a winding of magnet coil 1, and with core 2 makes possible a particularly compact configuration of the injection valve in the region of magnet coil 1. Core 2 is configured in stepped manner, and includes (in the axial extension region of magnet coil 1) a step 5 which serves as stop surface for an armature 6. In contrast to conventional injection valves, core 2 extends further beyond step 5 in the downstream direction, so that a sleeve-shaped valve seat support 10, arranged downstream from the magnet coil subassembly, does not need to be joined to core 2 in the region of step 5. Downstream from step 5, core 2 includes a wall which is also tubular but is much thinner than magnetic throttling point 13, which has the same wall thickness as the rest of core 2. Continuing from throttling point 13 in the downstream direction is a lower core end 14 which in turn possesses a much greater wall thickness than throttling point 13.

Downstream from step 5 of core 2, magnetic throttling point 13 extends concentrically with a longitudinal valve axis 15 about which core 2 and valve seat support 10, for example, extend concentrically. In this region, the conventional injection valves provide immediately downstream from the core end, nonmagnetic metal spacer elements which provide for magnetic separation of core 2 and valve seat support 10,because core 2 is configured with a magnetic throttling point 13, according to the present invention, a nonmagnetic spacer element of this kind can be dispensed with.

A longitudinal opening 18, which is also configured concentrically with longitudinal valve axis 15, extends in valve seat support 10 which serves as the joining part and represents a tubular, thin-walled sleeve. Arranged in longitudinal opening 18 is a valve needle 19 according to the present invention having an elongated joining part 19', which is joined at its downstream end 20, for example by welding, to a, for example, spherical valve closure element 21 on whose periphery are provided, for example, five flattened areas 22 past which a fluid, in particular fuel, can flow. Valve seat support 10 is joined in sealed manner, for example by welding, to lower core end 14 of core 2, and thereby, with an upper sleeve section 24, axially surrounds a portion of core end 14.

Valve seat support 10, consisting for example of nonmagnetic steel, surrounds not only core end 14 but also, at its opposite end, a valve seat element 29 and a perforated spray disk 34 attached to valve seat carrier 29. Valve seat support 10 is configured in elongated fashion, such that valve seat support 10 can constitute half or more of the total axial extension length of the injection valve. With this configuration of valve seat support 10, the spray discharge point of the injection valve is set far forward. With the usual installation locations of injection valves in internal combustion engines, the injection valve extends, with its downstream end and thus with its metering and spray discharge region, deep into the intake manifold. As a result, by a targeted spray discharge into one or more intake valves, wall wetting of the intake manifold can be largely prevented. Thus exhaust emissions of the internal combustion engine can be reduced.

Actuation of the injection valve is generally electromagnetically. The electromagnetic circuit with magnet coil 1, core 2, and armature 6 facilitates an axial movement of valve needle 19, including all the parts movable in longitudinal opening 18, and thus for opening (against the spring force of a return spring 25) and closing of the injection valve. Armature 6 is joined by a weld bead to the end 40 of joining part 19' facing away from valve closure element 21, and it aligned on core 2. Armature 6 thereby at least partially encloses end 40 of joining part 19'. In longitudinal opening its, valve seat element 29, which its, for example, cylindrical and has a fixed valve seat 30, is mounted in sealed fashion, by welding, into the end of valve seat support 10 located downstream and facing away from core 2.

A guide opening 32 of valve seat element 29 guides valve closure element 21 during the axial movement of valve needle 19 with armature 6 along longitudinal valve axis 15. Armature 6 its guided during the axial movement in core 2, in particular in the region of magnetic throttling point 13. A particularly configured guide surface, for example, can be provided for such movement on the outer periphery of armature 6. The spherical valve closure element 21 cooperates with valve seat 30, which tapers in truncated conical form in the flow direction, of valve seat element 29. At its end face facing away from valve closure element 21, valve seat element 29 is joined immovably to the, for example, cup-shaped perforated spray disk 34. Perforated spray disk 34 includes at least one (e.g., four) spray discharge openings 35 shaped by electrodischarge machining, punching, or etching processes. A retaining rim of perforated spray disk 34 is bent conically outward so that the rim rests against the inner wall, defined by longitudinal opening 18, of valve seat support 10, so that a radial pressure exists. Perforated spray disk 34 is joined to the wall of valve seat support 10 using, for example, a peripheral and sealed weld bead produced, for example, by a laser. The fuel is prevented from flowing through directly into an intake duct of the internal combustion engine, outside spray discharge openings 35, by the weld beads on perforated spray disk 34.

The insertion depth of valve seat element 29, with perforated spray disk 34, into valve seat support 10 determines the magnitude of the stroke of valve needle 19 Thus, the one end position of valve needle 19, when magnet coil 1 is not energized, is defined by contact of valve closure element 21 against valve seat 30, while the other end position of valve needle 19, when magnet coil 1 is energized, is provided by contact of armature 6 against step 5 of core 2. Magnet coil 1 is surrounded by a directing element 45, configured for example as a bracket and serving as ferromagnetic element, which at least partly surrounds magnet coil 1 in the circumferential direction and rests with its two ends on core 2 upstream and downstream from throttling point 13 and can be joined thereto, for example, by welding, soldering, or adhesive bonding methods.

Outside valve seat support 10, the electromagnetically actuatable valve is substantially enclosed by an injection-molded plastic sheath 50 which extends from core 2 in the axial direction, via magnet coil 1 and the at least one directing element 45, to valve seat support 10, at least one directing element 45 is completely covered axially and in the circumferential direction by injection molded plastic sheath 50. Injection-molded plastic sheath 50 includes an electrical connector 52 that is co-injected on. By means of electrical connector 52, electrical contact is made to magnet coil 1 to be energized.

The use of the relatively cheap sleeve for valve seat support 10 makes it possible to dispense with lathe-turned parts which are common in injection. The larger outside diameter of the conventional injection valves are bulkier and more expensive to manufacture than valve seat support 10. This is particularly advantageous when, as in the case of the valve according to the present invention, the spray discharge point is to be set or displaced far forward, since the material savings as compared with conventional solid valve seat supports or nozzle holders are considerable. The thin-walled valve seat support 10 has teen configured, for example, by deep drawing method, with, a nonmagnetic material, for example a corrosion-resistant CrNi steel, is used. The elongated valve seat support 10 has, near lower end 55 of injection-molded plastic sheath 50, a peripheral annular bead 56 which is formed by folding and, which projects outward. End 55 of injection-molded plastic sheath 50 and annular bead 56 constitute, together with the outer wall of valve seat support 10 in this region, an annular groove 57, A sealing ring 58 arranged in annular groove 57 provides sealing between the periphery of the injection valve and a valve receptacle (not shown), for example the intake duct of the internal combustion engine.

A preference for a spray discharge point to be set or displaced far forward, which when the injection valve is installed can project well into an intake duct, requires actions to decrease the volumes and masses of the components (which are elongated) of the injection valve. The spray discharge point of the injection valve downstream of valve closure element 21 lies, for example, much farther from magnet coil 1 or from the contact region of core 2 and armature 6 than an inlet-side end 59 of core 2 or of the entire injection valve from magnet coil 1 or from the stop region.

In addition to valve seat support 10, valve needle 19 also has a long length compared to the overall valve length, which extends, for example, more than half the valve length and should be lightweight but nevertheless stable and economical.

In order to minimize any change in stroke length as a function of temperature, joining part 19', is produced, for example, from austenitic steel. For easier attachment of armature 6 and valve closure element 21 thereto, the respective axial ends 20 and 40 of joining part 19' are configured, in a tubular manner, thus resulting, in cross section, in an annular profile which is separated, for example, only by a narrow axially extending slit 60. At its respective ends 20 and 40, joining part 19' is similar to a valve needle described in German Patent Application. No. 40 08 675. A different profile is provided over the majority of the extension length of joining part 19'. A middle region 61, extending for example 75% of the total length, of joining part 19' has a stamped profile whose cross section (external and internal dimensions) is much smaller than the cross sections of ends 20 and 40. This is because in region 61, the outer periphery of joining part 19' is reduced as compared with the outer periphery of ends 20 and 40. The "outer periphery" means only a contour line that extends facing away from longitudinal valve axis 15 and thus does not also include the respective inner wall facing longitudinal valve axis 15.

Figure 2:
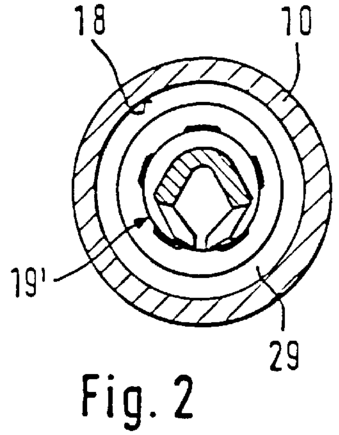
FIG. 2 shows a section through the valve needle and the valve seat support along line II—II of FIG. 1.
Figure 3A:
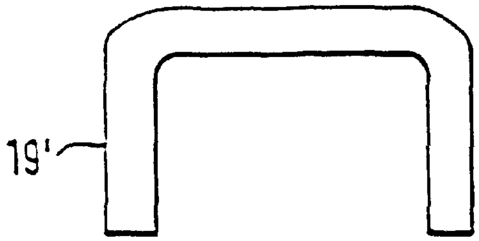
FIG. 3*a* shows a first exemplary embodiment of a profile of the joining part to having a U-shaped cross section.
Figure 3B:
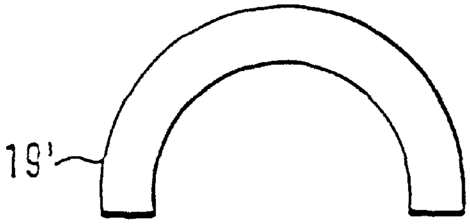
FIG. 3*b* shows a second exemplary embodiment of the profile of the joining parts having a C-shaped cross section.
Figure 3C:
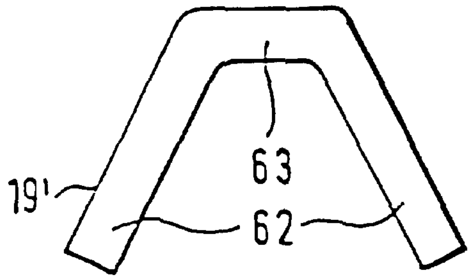
FIG. 3*c* shows a third exemplary embodiment of the profile of the joining parts having a V-shaped cross section.
Figure 3D:
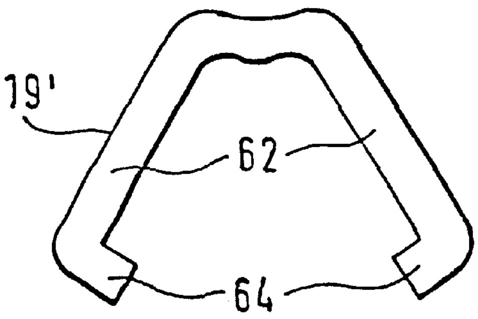
FIG. 3*d* shows a fourth exemplary embodiment of the profile of the joining parts having a hairpin-shaped cross section.

FIG. 2 shows, as a sectioned illustration through valve Seat support 10 and joining part 19' along line II—II in FIG. 1, an example of a possible profile of joining part 19'. The profiles of joining part 19' according to the present invention are open on one side, and thus have cross sections which possess U-, V-, or C-shapes, or shapes slightly deviating from or modified with respect to the above described shapes. In addition to the clip-shaped profile shown in FIG. 2, joining parts 19' can have cross sections as shown in FIGS. 3*a*–3*d*.

A U-shaped profile (shown in FIG. 3*a*) is provided by rounding the corners. A C-shaped profile (show in FIG. 3B) is provided and can be further closed, and thus represents e.g., 75% of the annular crone section. A V-shaped profile (shown in FIG. 3*c*) is provided in which either the two arms 62 join one another directly at an acute angle, or the two arms 62 are joined via a rounded or straight base region 63. In addition, a gripper-like, claw-shaped, clip-shaped, or hairpin-shaped profile (shown in FIGS. 2 and 3*d*) is possible in which arms 62 extend in straight or rounded fashion and have at their ends, for example, angled, bent, hook-like kinks 64.

All these examples of joining parts 19' are punched and bent parts which are shaped from originally flat sheet-metal parts. Not only ends 20 and 40 with their annular cross sections, but also the center regions 61 with their particular cross sections, are shaped in a special bending tool. The final contour of joining part 19', its achieved by bending and stamping processes. According to the present invention, a mass reduction of approximately 30% is possible as compared with joining parts 19' having a continuously annular profile. The wear forces at valve seat 30 can advantageously be reduced by the lower mass of valve needle 19.

We claim:

1. An electromagnetically actuatable valve, comprising:

a core surrounded by a magnet coil;

a valve needle including an armature facing the core, a joining portion and a valve closure element, the joining portion being provided by punching and bending a sheet metal; and an immovable valve seat cooperating with the valve needle, wherein the armature immovably couples to a first end of the joining portion, and the valve closure element immovably couples to a second end of the joining portion, the first and second ends having a substantially continuously peripheral annular cross section with a first outer periphery, and wherein the joining portion includes a middle part positioned between the first end and the second end, the middle part having an open profile, the open profile having a second outer periphery smaller than the first outer periphery.

2. The electromagnetically actuatable valve according to claim 1, wherein the open profile of the middle part includes a U-shaped profile.

3. The electromagnetically actuatable valve according to claim 1, wherein the open profile of the middle part includes a C-shaped profile.

4. The electromagnetically actuatable valve according to claim 1, wherein the open profile of the middle part includes a V-shaped profile.

5. The electromagnetically actuatable valve according to claim 1, wherein the open profile of the middle part includes one of a gripper-shaped profile, a claw-shaped profile, a clip-shaped profile and a hairpin-shaped profile.

6. The electromagnetically actuatable valve according to claim 1, wherein the middle part extends along at least 75% of a total length of the joining portion.

7. The electromagnetically actuatable valve according to claim 1, wherein the valve needle extends more than 50% of a total length of the electromagnetically actuatable valve.

8. The electromagnetically actuatable valve according to claim 1, wherein the electromagnetically actuatable valve has a spray discharge point positioned downstream from the valve closure element, the spray discharge point situated farther from the magnet coil than an inlet-side end of the electromagnetically actuatable valve.

9. The electromagnetically actuatable valve according to claim 1, wherein the joining portion is provided by bending and stamping processes.

10. The electromagnetically actuatable valve according to claim 1, wherein the immovable valve seat is situated in a valve seat support part, the valve seat support part including a thin-walled sleeve.

11. The electromagnetically actuatable valve according to claim 1, wherein the electromagnetically actuatable valve includes an injection valve for a fuel injection system of an internal combustion engine.

* * * * *